(12) United States Patent
Yoo et al.

(10) Patent No.: US 9,643,482 B2
(45) Date of Patent: May 9, 2017

(54) ACTIVE AIR FLAP AND ACTIVE AIR FLAP ASSEMBLY

(71) Applicant: Hyundai Motor Company, Seoul (KR)

(72) Inventors: Gil-Sang Yoo, Incheon (KR); Jeong-Ho Lee, Gyeonggi-do (KR); Young-Ik Cho, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/954,662

(22) Filed: Nov. 30, 2015

(65) Prior Publication Data
US 2017/0072784 A1 Mar. 16, 2017

(30) Foreign Application Priority Data
Sep. 15, 2015 (KR) .................. 10-2015-0130112

(51) Int. Cl.
*B60K 11/08* (2006.01)
(52) U.S. Cl.
CPC .................. *B60K 11/085* (2013.01)
(58) Field of Classification Search
CPC ....... B60K 11/085; B60K 11/00; B60K 11/08; B60K 11/04; B60H 1/12
See application file for complete search history.

(56) References Cited

U.S. PATENT DOCUMENTS

| | | | | |
|---|---|---|---|---|
| 7,325,864 | B1* | 2/2008 | Echeverria | B60R 19/52 180/68.6 |
| 9,216,643 | B2* | 12/2015 | Anderson | B60K 11/04 |
| 2012/0091757 | A1* | 4/2012 | Tregnago | B60K 11/085 296/193.1 |

FOREIGN PATENT DOCUMENTS

| | | |
|---|---|---|
| JP | 2011-201439 A | 10/2011 |
| JP | 2012-503567 A | 2/2012 |
| JP | 2013-203157 A | 10/2013 |
| JP | 2015-016744 A | 1/2015 |
| JP | 2015-101279 A | 6/2015 |
| KR | 2011-0021021 A | 3/2011 |
| KR | 10-10-1316203 | 10/2013 |
| KR | 2015-0070769 A | 6/2015 |

* cited by examiner

*Primary Examiner* — John Walters
*Assistant Examiner* — James Triggs
(74) *Attorney, Agent, or Firm* — Mintz Levin Cohn Ferris Glovsky and Popeo, P.C.; Peter F. Corless

(57) ABSTRACT

An active air flap is provided. The active air flap includes a plurality of flaps and an elastic member bonding the plurality of flaps to form a preset angle with respect to each other. The elastic member is insert-molded between the respective flaps and a roller is coupled to the top of the active air flap with a connection member and the active air flap is wound there around by a restoring force of the elastic member. Additionally, a support bracket that rotatably supports the roller through pins protrudes from a plurality of ends of the roller, and has an aperture formed therein and the active air flap is configured to open or close the aperture.

7 Claims, 7 Drawing Sheets

ACTIVE AIR FLAP AND ACTIVE AIR FLAP ASSEMBLY

CROSS-REFERENCE TO RELATED APPLICATIONS

This application claims priority to Korean Patent Application No. 10-2015-0130112, filed on Sep. 15, 2015, which is incorporated herein by reference in its entirety.

BACKGROUND

Field of the Invention

The present invention relates to an active air flap and an active air flap assembly, and more particularly, to an active air flap which automatically opens an air flap when an actuator error occurs or power supplied to the actuator is disengaged, and an active air flap assembly.

Description of Related Art

Generally, an engine compartment of a vehicle includes various heat exchangers such as a radiator, an intercooler, an evaporator, and a condenser as well as components for operation, such as an engine. The heat exchangers contain a heat-exchange medium circulating therein. As the heat-exchange medium contained within the heat exchangers circulates the heat with the air external to the heat exchangers, cooling or heat radiation occurs. Thus, to ensure that the various heat exchangers in the engine compartment of the vehicle are stably operated, the external air is continuously supplied into the engine compartment. However, when the vehicle operates at high speed, a substantial amount of external air is introduced at high speed and thus increases the air resistance. Accordingly, the fuel efficiency of the vehicle may be degraded.

Accordingly, an active air flap device has been developed. The active air flap device increases the amount of air introduced to the engine compartment by increasing an opening angle during low-speed operation, and reduces the amount of air introduced to the engine compartment by reducing the opening angle during high-speed operation, thereby improving fuel efficiency.

FIGS. 1 and 2 are exemplary diagrams that describe the problem of the conventional active air flap device according to the related art. Referring to FIGS. 1 and 2, when an actuator is operated by an external condition (e.g., engine temperature or cooling water temperature), the air flap of the conventional active air flap device is rotated to open or close a duct. In the conventional active air flap device, however, the air flap cannot be operated when an actuator error occurs or power supplied to the actuator is disengaged. In particular, when the air flap cannot be operated when the air flap closes the duct, the temperatures of the engine and the heat exchangers may be increased causing vehicle error.

The foregoing is intended merely to aid in the understanding of the background of the present invention, and is not intended to mean that the present invention falls within the purview of the related art that is already known to those skilled in the art.

SUMMARY

The present invention provides an active air flap which automatically opens an air flap when an actuator error occurs or power supplied to the actuator is disengaged, and an active air flap assembly.

In accordance with an exemplary embodiment of the present invention, an active air flap may include a plurality of flaps, and an elastic member that bonds the plurality of flaps to form a preset angle with respect to each other. The elastic member may be insert-molded between the respective flaps. Further, an active air flap assembly may include the active air flap a roller coupled to the top of the active air flap by a connection member and an active air flap is wound there around by a restoring force of the elastic member and a support bracket rotatably supports the roller through pins that protrude from a plurality of ends of the roller. Additionally, an aperture formed therein, the though hole may be opened or closed by the active air flap.

The active air flap assembly may further include an actuator disposed on the support bracket and may be configured to rotate the roller to actuate the active air flap to an open or close the aperture. The active air flap assembly may further include an electromagnet disposed on the support bracket and the active air flap may be fixed to a close the aperture by the operation of the actuator when a current is supplied. The electromagnet may be disposed at the bottom and at a plurality of sides of the support bracket.

The plurality of flaps may be formed of a magnetic substance. The active air flap may include a fastening member disposed at the contact portion between the active air flap and the electromagnet. The fastening member may be formed of a magnetic substance. The plurality of active air flap assemblies may be stacked. When an actuator error occurs or power supplied to the actuator may be disengaged, power supplied to the electromagnet may be disengaged.

BRIEF DESCRIPTION OF THE DRAWINGS

A brief description of each drawing is provided to more sufficiently understand drawings used in the detailed description of the present invention.

DETAILED DESCRIPTION

Figure 1:
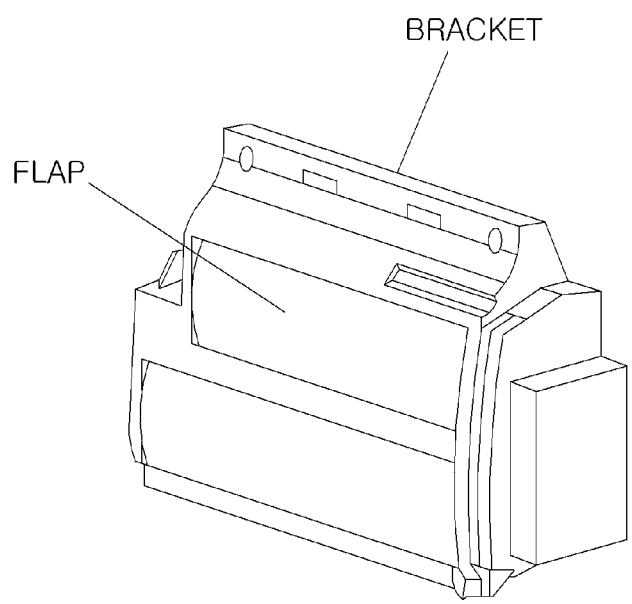
FIGS. 1 and 2 are exemplary diagrams for describing the problems of a conventional active air flap device according to the related art.
Figure 2:
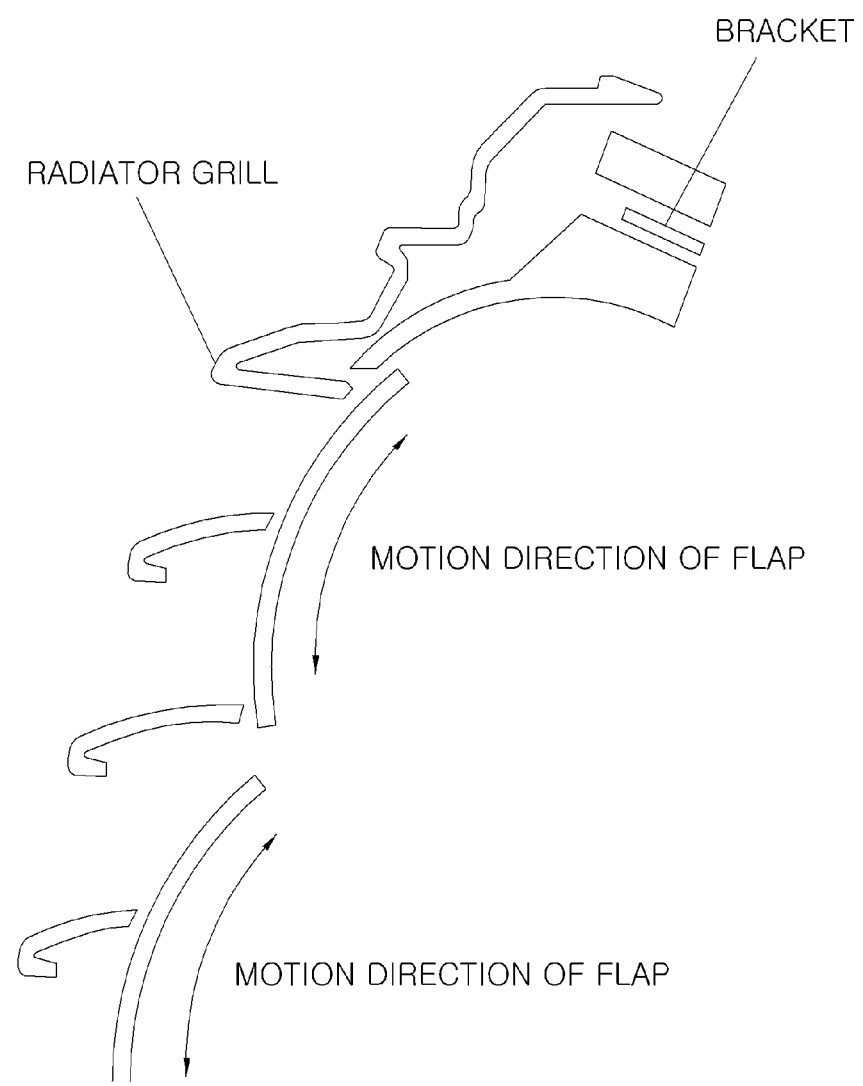

Exemplary embodiments of the present invention will be described below in more detail with reference to the accompanying drawings. The present invention may, however, be embodied in different forms and should not be construed as limited to the embodiments set forth herein. Rather, these exemplary embodiments are provided so that this disclosure will be thorough and complete, and will fully convey the scope of the present invention to those skilled in the art. Throughout the disclosure, like reference numerals refer to like parts throughout the various figures and embodiments of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Figure 5:
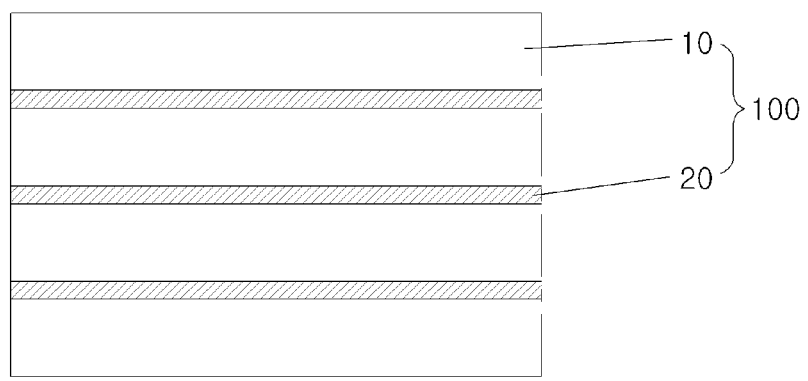
FIG. 5 is an exemplary expanded view of an active air flap in accordance with an exemplary embodiment of the present invention.

FIG. 5 is an exemplary expanded view of an active air flap in accordance with an exemplary embodiment of the present invention. Referring to FIG. 5, the active air flap may include a plurality of flaps 10 and an elastic member 20 that may bond the plurality of flaps 10 to form a preset angle with respect to each other. The preset angle may indicate an angle at which the plurality of flaps 10 are rolled upward in the form of a roller by a restoring force of the elastic member 20. The preset angle may be adjusted based on the type of the active air flap. The elastic member 20 may be insert-molded between the respective flaps 10. Thus, the elastic member 20 and the plurality of flaps 10 may be integrated with each other. In particular, the plurality of flaps 10 may maintain the preset angle provided that an external force may be applied.

Figure 3:
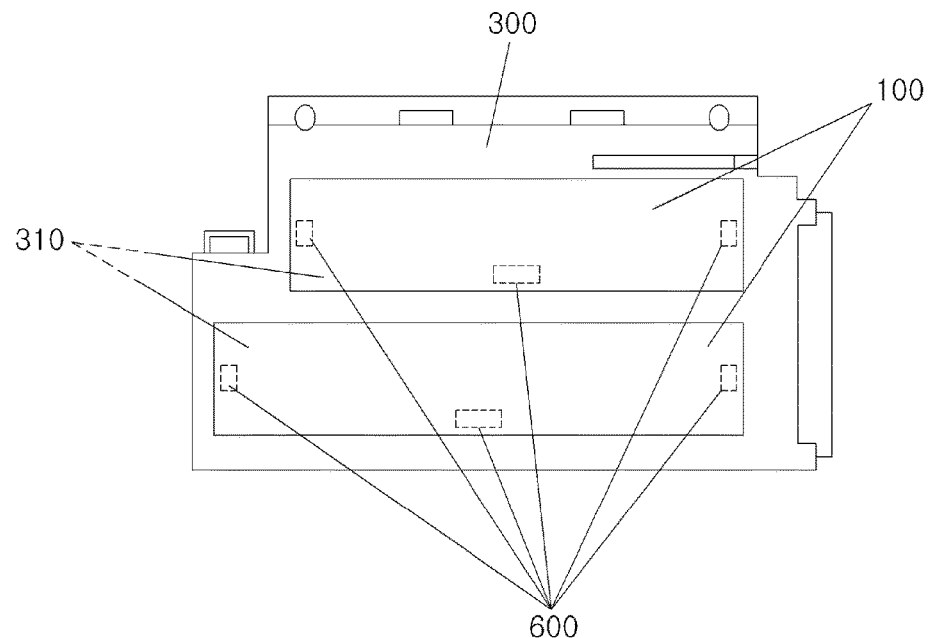
FIG. 3 is an exemplary front view of an active air flap assembly, illustrating a state in which the active air flap assembly is closed according to an exemplary embodiment of the present invention.
Figure 4:
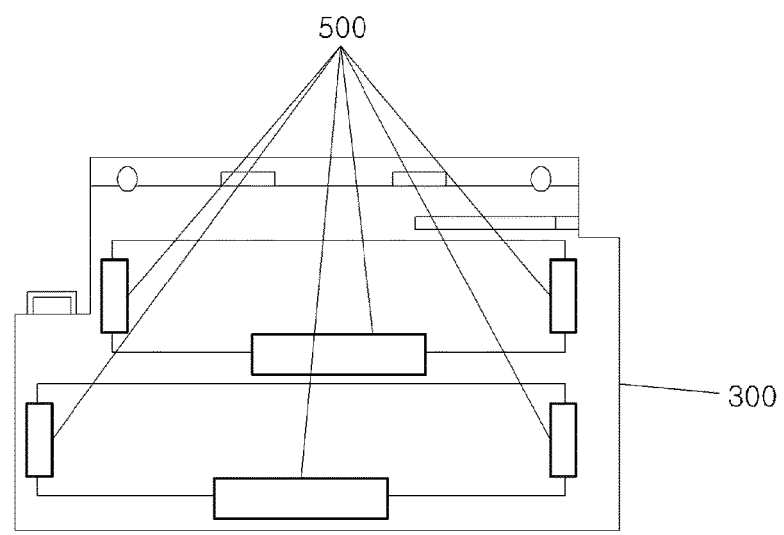
FIG. 4 is an exemplary front view of the active air flap assembly, illustrating a state in which the active air flap assembly is opened according to an exemplary embodiment of the present invention.
Figure 6:
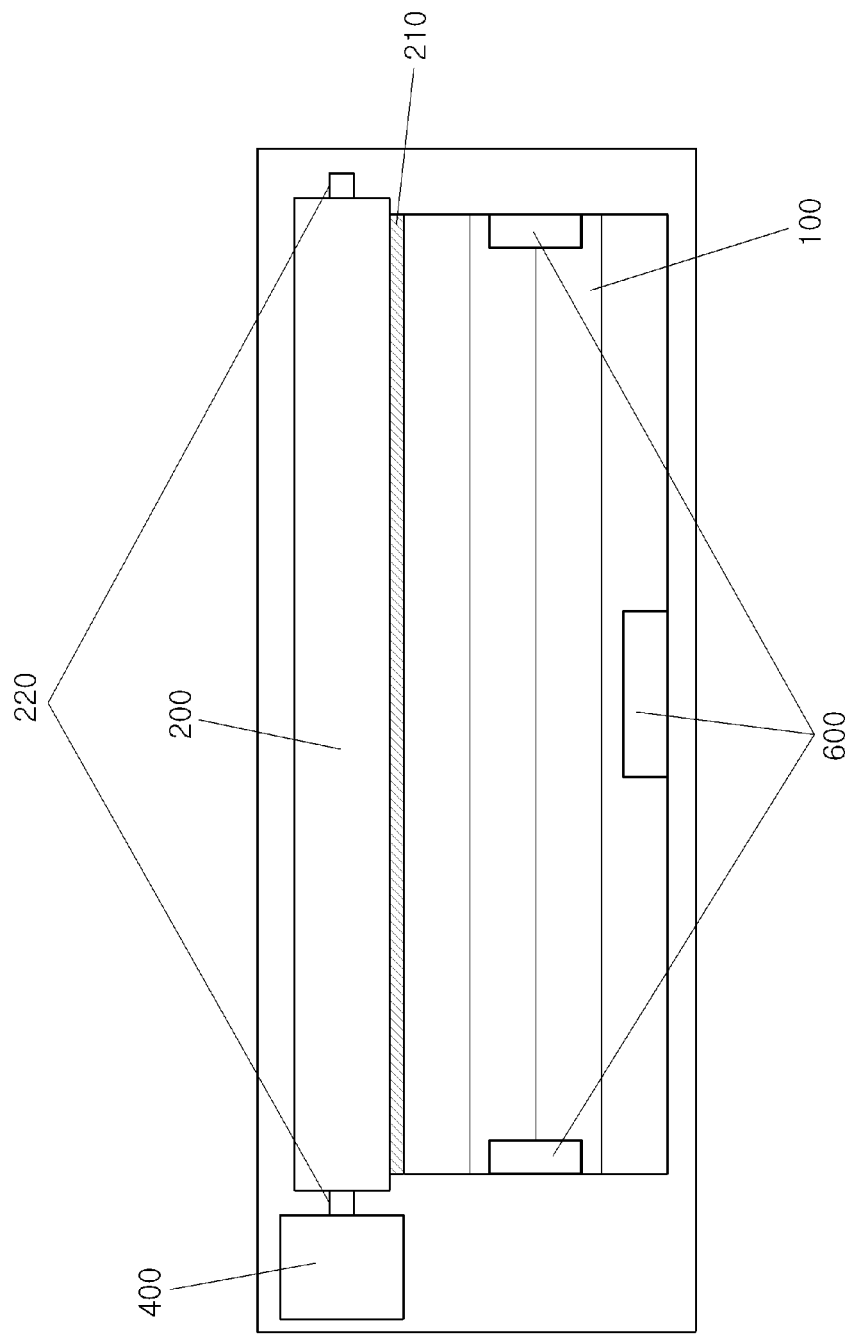
FIG. 6 is an exemplary rear view of the active air flap assembly according to an exemplary embodiment of the present invention.
Figure 7:
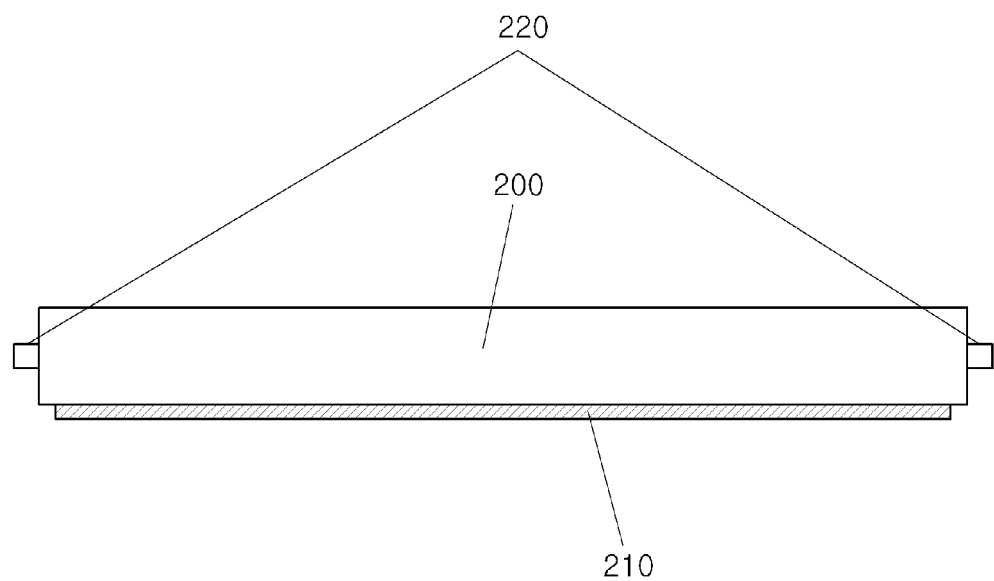
FIG. 7 is an exemplary expanded view of a roller included in the active air flap assembly according to an exemplary embodiment of the present invention.

FIG. 3 is an exemplary front view of an active air flap assembly in accordance with an exemplary embodiment of the present invention, illustrating the active air flap assembly disposed in a closed position. FIG. 4 is an exemplary front view of the active air flap assembly in accordance with the exemplary embodiment of the present invention, illustrating the active air flap assembly in an opened position. FIG. 6 is an exemplary rear view of the active air flap assembly in accordance with the exemplary embodiment of the present invention. FIG. 7 is an exemplary expanded view of a roller within in the active air flap assembly in accordance with the exemplary embodiment of the present invention. Referring to FIGS. 3, 4, 6, and 7, the active air flap assembly in accordance with the exemplary embodiment of the present invention may include the active air flap 100, a roller 200, a support bracket 300, an actuator 400, and an electromagnet 500.

The roller 200 may be coupled to the top of the active air flap 100 by a connection member 210. The active air flap 100 may be wound around the roller 200 by a restoring force of the elastic member 20. The support bracket 300 may rotatably support the roller 200 using pins 220 that protrude from a plurality of ends (e.g., both ends) of the roller 200. Furthermore, a aperture 310 may be formed in the support bracket 300 that may be opened or closed by the active air flap 100. The actuator 400 may be disposed on the support bracket 300, and may be configured to rotate the roller 200 such that the active air flap 100 opens or closes the aperture 310.

The electromagnet 500 may be disposed on the support bracket 300, and may fix (e.g., maintain a static position of) the active air flap 100 that closes the aperture 310 based on the operation of the actuator 400 when a current is supplied. The electromagnet 500 may be disposed at the bottom and both sides of the support bracket 300. When a voltage is applied to the electromagnet 500, the electromagnet at the bottom of the support bracket 300 may prevent the active air flap 100 from being rolled up by the restoring force of the elastic member 20, and the electromagnets at both sides of the support bracket 300 may prevent the active air flap 100 from swaying (e.g., having a lateral movement) from side to side due to air resistance.

Hereafter, a unit through which the electromagnet 500 fixes (e.g., maintains a static position of) the active air flap 100 will be described. The plurality of flaps 100 may be formed of a magnetic substance such as steel. Accordingly, when a voltage is applied to the electromagnets 500, the plurality of flaps 10 may be attached and coupled (e.g., fixed) to the electromagnets 500.

Furthermore, a fastening member 600 may be disposed at the contact portion between the active air flap 100 and the electromagnet 500. The fastening member 600 may be formed of a magnetic substance such as steel. Accordingly, when a voltage is applied to the electromagnet 500, the fastening member 600 coupled to the active air flap 100 may be attached and coupled to (e.g., fixed) to the electromagnet 500.

In the exemplary embodiment of the present invention, a single active air flap assembly may be provided. Additionally, a plurality of active air flap assemblies may be stacked. FIGS. 3 and 4 illustrate that two active air flap assemblies may be vertically stacked, but the present invention is not limited thereto. The number of stacked active air flap assemblies may be changed based on the area of an opening of a radiator grill. In the active air flap assembly, when the actuator 400 error occurs or power supplied to the actuator 400 is disengaged, the power supplied to the electromagnet 500 may be disengaged. In other words, when the actuator error occurs or the power supplied to the actuator is disengaged, the power supplied to the electromagnet 500 may be disengaged to automatically open the active air flap assembly.

Figure 8A:
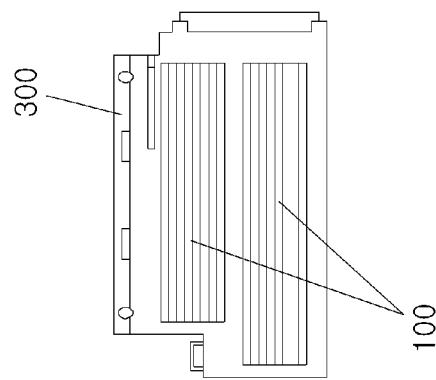
FIGS. 8A, 8B and 8C are exemplary diagrams illustrating an operation state of the active air flap assembly according to an exemplary embodiment of the present invention.

FIG. 8 is an exemplary diagram illustrating an operation state of the active air flap assembly in accordance with the exemplary embodiment of the present invention. Referring to FIG. 8, when the actuator error occurs or power supplied to the actuator is disengaged the active air flap is closed, power supplied to the electromagnet 500 may also be disengaged. Accordingly, the constraint force for the active air flap 100 may also disappear (e.g., of FIG. 8A).

Figure 8B:
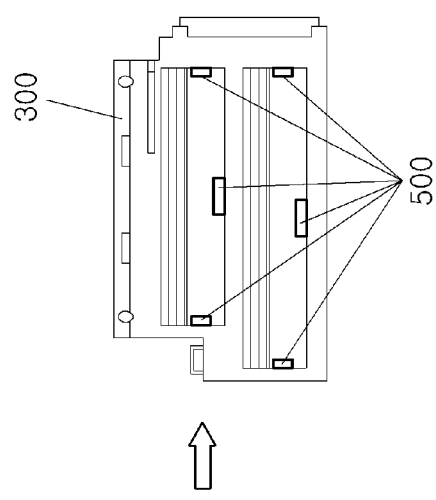
Figure 8C:
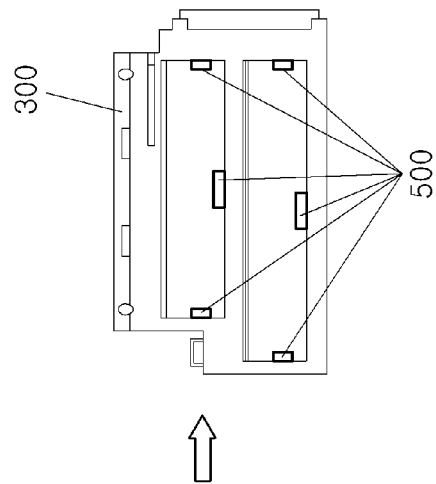

Furthermore, the active air flap 100 may be rolled up around the roller 200 by the restoring force of the elastic member 20, the aperture 310 may be opened (e.g., FIG. 8B). Additionally, when the active air flap 100 is rolled up around the roller 200, the aperture 310 may be completely opened. Thus, even when the vehicle is operated, the active air flap may be prevented from being closed, that makes suppression of an increase in temperature of the engine and the other heat exchangers possible. (e.g., FIG. 8C). In accordance with the exemplary embodiment of the present invention, the active air flap may be prevented from being closed even when the actuator error occurs or the power supplied to the actuator is disengaged, thereby enabling suppression of the increase in temperature of the engine and the heat exchangers.

While the present invention has been described with respect to the exemplary embodiments, it will be apparent to those skilled in the art that various changes and modifications may be made without departing from the spirit and scope of the invention as defined in the following claims.

What is claimed is:

1. An active air flap assembly, comprising:
   a plurality of flaps; and
   an elastic member that bonds the plurality of flaps to form a preset angle with respect to each other, wherein the elastic member is insert-molded between the respective flaps;
   a roller coupled to the top of the active air flap with a connection member and having the active air flap wound there around by the elastic member;
   a support bracket that rotatably supports the roller through pins that protrude from a plurality of ends of the roller, and having a aperture formed therein and the active air flap is configured to open or close the aperture;
   an actuator disposed on the support bracket and configured to rotate the roller such that the active air flap opens or closes the aperture; and
   an electromagnet disposed on the support bracket and coupling the active air flap to the support bracket in order to keep the aperture closed when a current is supplied.

2. The active air flap assembly of claim 1, wherein the electromagnet is disposed at the bottom and both sides of the support bracket.

3. The active air flap assembly of claim 1, wherein the plurality of flaps are formed of a magnetic substance.

4. The active air flap assembly of claim 1, wherein the active air flap includes a fastening member disposed at the contact portion between the active air flap and the electromagnet.

5. The active air flap assembly of claim 4, wherein the fastening member is formed of a magnetic substance.

6. The active air flap assembly of claim 1, wherein the plurality of active air flap assemblies are stacked.

7. The active air flap assembly of claim 1, wherein when an actuator error occurs or power supplied to the actuator is disengaged power supplied to the electromagnet is disengaged.

* * * * *